(12) United States Patent
Ueda et al.

(10) Patent No.: US 7,429,810 B2
(45) Date of Patent: Sep. 30, 2008

(54) ELECTRIC ROTARY MACHINE

(75) Inventors: Toshiaki Ueda, Chiyoda-ku (JP);
Takeshi Sakai, Chiyoda-ku (JP);
Susumu Terumoto, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/226,299

(22) Filed: Sep. 15, 2005

(65) Prior Publication Data

US 2006/0138876 A1     Jun. 29, 2006

Related U.S. Application Data

(62) Division of application No. 10/448,078, filed on May 30, 2003, now Pat. No. 7,009,316.

(30) Foreign Application Priority Data

May 31, 2002   (JP) .............................. 2002-158507

(51) Int. Cl.
*H02K 9/00* (2006.01)
(52) U.S. Cl. .............................. 310/54; 310/89; 310/43
(58) Field of Classification Search ................... 310/89, 310/43, 52, 54, 57–59
See application file for complete search history.

(56) References Cited

U.S. PATENT DOCUMENTS

| | | | |
|---|---|---|---|
| 2,650,992 A * | 9/1953 | Forss et al. ................... 310/42 |
| 3,688,137 A | 8/1972 | Filhol | |
| 4,015,154 A | 3/1977 | Tanaka et al. | |
| 4,128,527 A | 12/1978 | Kinjo et al. | |
| 4,210,832 A * | 7/1980 | Ascoli .......................... 310/50 |
| 4,352,897 A | 10/1982 | Ogata et al. | |
| 4,387,311 A | 6/1983 | Kobayashi et al. | |
| 4,387,313 A | 6/1983 | Yamamoto et al. | |
| 4,412,146 A * | 10/1983 | Futterer et al. ............... 310/266 |
| 4,482,829 A * | 11/1984 | Tardieu et al. ............... 310/105 |
| 4,814,651 A * | 3/1989 | Elris et al. ..................... 310/88 |
| 4,868,970 A | 9/1989 | Schultz et al. | |
| 5,459,190 A | 10/1995 | Nakamura et al. | |
| 5,490,319 A | 2/1996 | Nakamura et al. | |
| 5,621,260 A * | 4/1997 | Fukuoka et al. ......... 310/154.04 |

(Continued)

FOREIGN PATENT DOCUMENTS

EP        055 3831 B1      12/1998

(Continued)

OTHER PUBLICATIONS

European Search Report dated Dec. 12, 2005.

*Primary Examiner*—Dang D Le
(74) *Attorney, Agent, or Firm*—Crowell & Moring LLP

(57) ABSTRACT

In the stator of a electric rotary machine in which heat conductive insulation resin is filled at the end portions of a stator coil, the material of a stator core, the stator coil, the heat conductive insulation resin and a frame is selected such that a linear thermal expansion coefficient $\alpha 1$ of the stator core, a linear thermal expansion coefficient $\alpha 2$ of the stator coil, a linear thermal expansion coefficient $\alpha 3$ of the heat conductive insulation resin being filled and a linear thermal expansion coefficient $\alpha 4$ of the frame satisfy a relation that $\alpha 1 < \alpha 2 < \alpha 4 \leq \alpha 3$. A cooling medium path is integrally formed within the frame made from aluminum through die casting molding.

5 Claims, 3 Drawing Sheets

U.S. PATENT DOCUMENTS

| | | | |
|---|---|---|---|
| 5,753,986 A * | 5/1998 | Ohtani | 310/56 |
| 5,952,745 A * | 9/1999 | Yasuda | 310/40 MM |
| 6,087,746 A | 7/2000 | Couvert et al. | |
| 6,160,332 A | 12/2000 | Tsuruhara | |
| 6,633,098 B2 | 10/2003 | Inaba et al. | |
| 6,657,331 B2 | 12/2003 | Asao et al. | |
| 6,731,028 B2 | 5/2004 | Derleth et al. | |
| 7,009,316 B2 * | 3/2006 | Ueda et al. | 310/43 |
| 7,023,113 B2 * | 4/2006 | Tajima et al. | 310/68 D |
| 2004/0000820 A1 * | 1/2004 | Cromas et al. | 310/52 |

FOREIGN PATENT DOCUMENTS

| | | |
|---|---|---|
| GB | 883684 | 12/1961 |
| JP | 60-55250 U | 4/1985 |
| JP | 07-312839 A | 11/1995 |
| JP | 8-223866 | 8/1996 |
| JP | 10-17758 | 1/1998 |
| JP | 10-51989 | 2/1998 |
| JP | 10-098844 A | 4/1998 |
| JP | 11-18353 | 1/1999 |
| JP | 110 18353 A | 1/1999 |
| JP | 11-153736 A | 6/1999 |
| JP | 11-243658 A | 9/1999 |
| JP | 11332136 A | 11/1999 |
| JP | 2000-209813 | 7/2000 |
| JP | 2001-086706 A | 3/2001 |

* cited by examiner

ELECTRIC ROTARY MACHINE

This application is a divisional of application Ser. No. 10/448,078, filed May 30, 2003 now U.S. Pat. No. 7,009,316.

BACKGROUND OF THE INVENTION

The present invention relates to a electric rotary machine having a cooling mechanism for cooling heat generated from the coil end portion of a stator (that is, a stator coil).

As disclosed in JP-A-10-51989, there is proposed a method wherein heat conductive resin is filled between the coil end portion of a stator and a frame (or a casing) and further metal material having a heat conductivity larger than that of the heat conductive resin is also inserted therein thereby to improve heat dissipation efficiency.

In the electric rotary machines such a generator for a vehicle which are required to be small in size and high in output, as disclosed in JP-A-2000-209813, a cooling medium path is formed at a frame portion thereof thereby to flow cooling medium therethrough and silicon resin is filled between the coil end portion of a stator (or a stator coil) and a frame (or a casing).

SUMMARY OF THE INVENTION

The conventional technique disclosed in JP-A-10-51989 has problems that since the heat conductive member made from metal material is fit into the both end portions of the frame, the number of manufacturing procedures of the machine increases, the productivity thereof degrades and the cost thereof rises due to the increase of the constituent elements thereof.

The conventional technique disclosed in JP-A-2000-209813 has a problem that the manufacturing workability of the machine is bad since the configuration of the cooling medium path is complicated. Further, since the silicon resin which linear thermal expansion coefficient is larger by one-digit or more than those of the material of the core, the coil of the stator and the frame is used as the heat conductive filling resin, the filling resin expands in the inner diameter side at the time of high temperature and so contacts with the rotor. Further, there arise problems that due to the difference of the thermal expansion coefficients, an excessive stress is generated between the frame and the filling resin and so stress is generated repeatedly at the frame and the stator coil. Furthermore, there arises a problem that since the silicon resin is expensive, the manufacturing cost of the machine arises.

Accordingly, in view of the aforesaid problems of the conventional techniques, an object of the present invention is to provide a electric rotary machine which can surely perform heat conduction between a stator coil and a frame without increasing the number of parts, increase heat dissipation efficiency of the stator coil, suppress the generation of stress between the frame, the coil and filling resin and improve the reliability of the electric rotary machine.

Another object of the present invention is to obtain the frame of a electric rotary machine which is good in assembling workability.

In order to attain at least one of the aforesaid objects, the present invention is configured by at least one of the following configurations.

1. In the case where a electric rotary machine frame is made from aluminum and provided with a cooling medium path surrounding the outer periphery of a stator, unsaturated polyester resin having a linear thermal expansion coefficient equal to or larger than that of aluminum is filled between the stator and the electric rotary machine frame.

2. In a electric rotary machine which includes the electric rotary machine frame provided with the cooling medium path at the outer periphery of the stator and in which insulation resin is filled between the electric rotary machine frame and the stator, grooves as a resin capture means are formed at the junction surface between the insulation resin and the electric rotary machine frame.

3. In the electric rotary machine including the stator formed by a bowl-shaped electric rotary machine frame, a cylindrical stator core and a stator coil wound around the cylindrical stator core and having coil end portions at the both sides of the cylindrical stator core, the stator core is fit into and fixed to the inner wall of the bowl-shaped electric rotary machine frame, and the coil end portions is molded and fixed by resin material at the inside of the frame, wherein a cavity is formed at the bowl-shaped electric rotary machine frame so as to cover the end coil portions of the stator coil and the outer periphery of the stator core, and cooling medium passes through the cavity.

4. The electric rotary machine frame is formed by an inner side frame and an outer side cylindrical frame, wherein the inner side frame is formed in a bowl shape in a manner that one side thereof is opened and the other side thereof has a bottom portion and a stator is fixed to the inner periphery thereof, the outer side cylindrical frame forms an outer frame of the electric rotary machine, the inner side frame and the outer side cylindrical frame are constituted as an integrally molded component which are coupled at portions in opposite to the bottom portions thereof, and a cavity is formed between the inner side frame and the outer side cylindrical frame.

5. The electric rotary machine frame is made from aluminum, formed in a bowl shape in a manner that one side thereof is opened and the other side thereof has a bottom portion and formed with a cylindrical cavity portion which is configured in a manner that the bottom portion side is opened between the inner periphery and the outer periphery of the frame and the opened side is closed, and cooling medium us injected into the cavity potion of the frame. The electric rotary machine further includes a sealing member attached to the opened side of the cavity portion to hermetically seal the opened end, a bracket attached to the opened end side of the bowl shaped frame and provided with a bearing at the center thereof, another bearing fixed at the center portion of the bottom portion of the bowl-shaped frame, and a rotor pivotally supported between the bearings.

Preferably, the bracket is fixed to the end surface of the frame by means of a screw.

Preferably, another bracket covering the outside of the sealing member is attached to the end portion of the sealing member at a side in opposite to the bracket side thereof, and a brush is disposed between the another bracket and the sealing member.

DETAILED DESCRIPTION OF THE INVENTION

Figure 1:
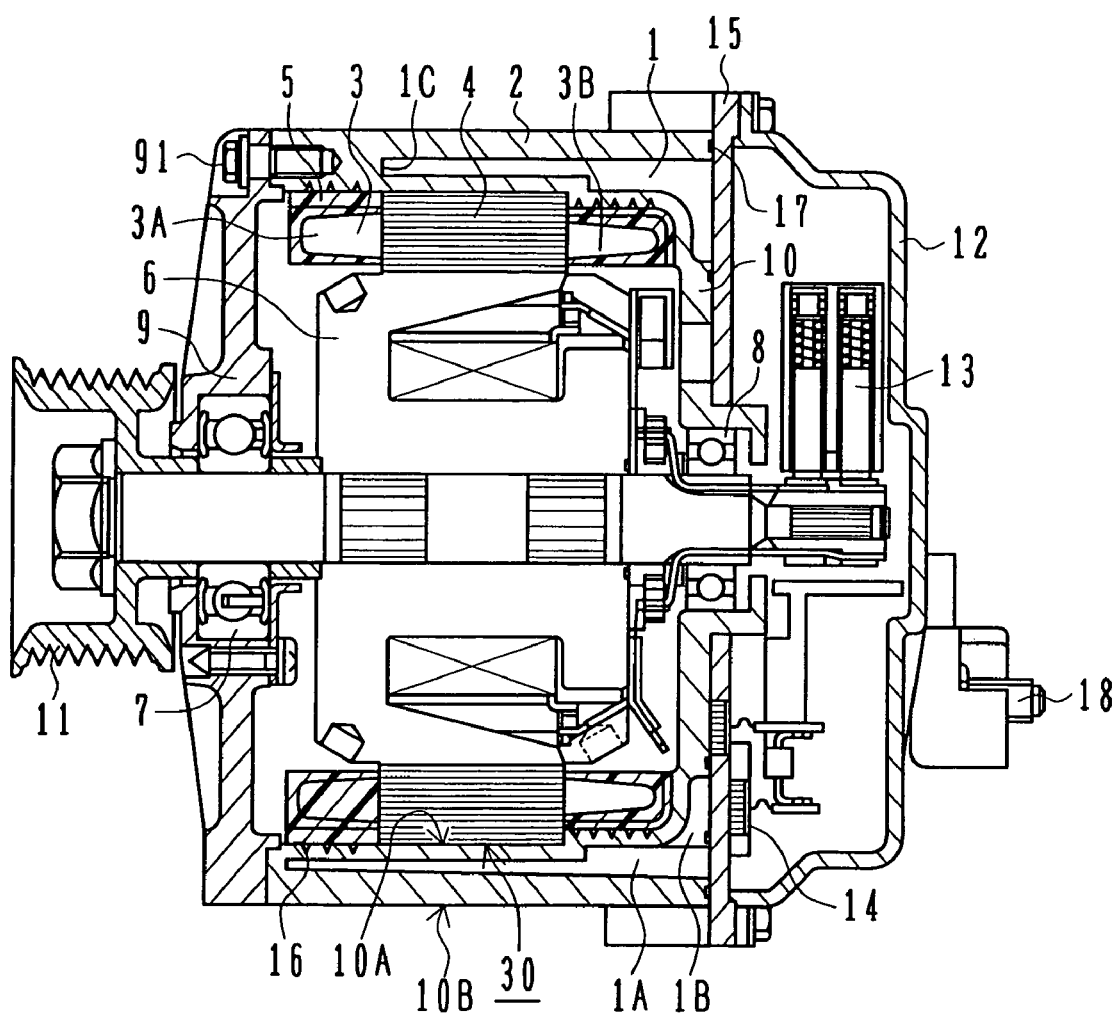
FIG. 1 is a sectional diagram showing an embodiment of the electric rotary machine according to the present invention.

The basic configuration of the electric rotary machine according to an embodiment of the present invention will be explained with reference to the accompanying drawings.

The electric rotary machine includes a bowl-shaped frame 2.

The electric rotary machine further includes a stator 30 configured by a stator core 4 of a cylindrical shape and a stator coil 3 which is wound around the cylindrical stator core 4 and has coil ends (including crossover portions) 3A, 3B provided at the both ends of the stator core 4.

The outer periphery of the stator core 4 of the stator 30 is fit into and fixed to the inner wall of the bowl-shaped frame 2, the stator coil 3 is molded and fixed at the inner side of the frame 2 by means of heat conductive insulation resin 5.

A cavity 1A is formed at the inner portion of the bowl-shaped frame 2, and the cavity 1A covers the coil end 3B and the stator core 4 of the stator coil 3 fit into and fixed to the inner wall of the bowl-shaped frame 2.

Cooling medium (cooling water in this embodiment) flows through the cavity 1A.

The frame 2 is configured in a bowl shape which one side is opened and the other side has a bottom portion 10. The cavity 1A of the cylindrical shape is formed in a manner that the bottom portion 10 side (1B) is opened between the inner peripheral surface 10A and the outer peripheral surface 10B and the open side (1C) of the frame 2 is closed.

The frame 2 is formed by aluminum die-cast.

The frame 2 has sealing members (a center plate 15 and an O ring 17) which is attached to the open side (1B) of the cavity 1A and hermetically seals the open end 1B.

The electric rotary machine includes a bracket (a front bracket 9) attached to the open end side of the bowl-shaped frame 2 and provided with a bearing 7 at the center, another bearing 8 fixed at the center of the bottom portion 10 of the bowl-shaped frame 2 and a rotor pivotally supported between the bearings (that is, the bearings 7 and 8), and the cooling medium is injected into the cavity 1A of the frame 2.

The front bracket 9 is fixed to the end surface of the frame 2 by means of a screw 91.

Another bracket (a rear bracket 12) covering the outside of the sealing members (the center plate 15 and the O ring 17) is attached to an end of the frame in opposite to the front bracket 9, and a brush 13 is disposed between the another bracket (the rear bracket 12) and the sealing members (the center plate 15 and the O ring 17).

Figure 2:
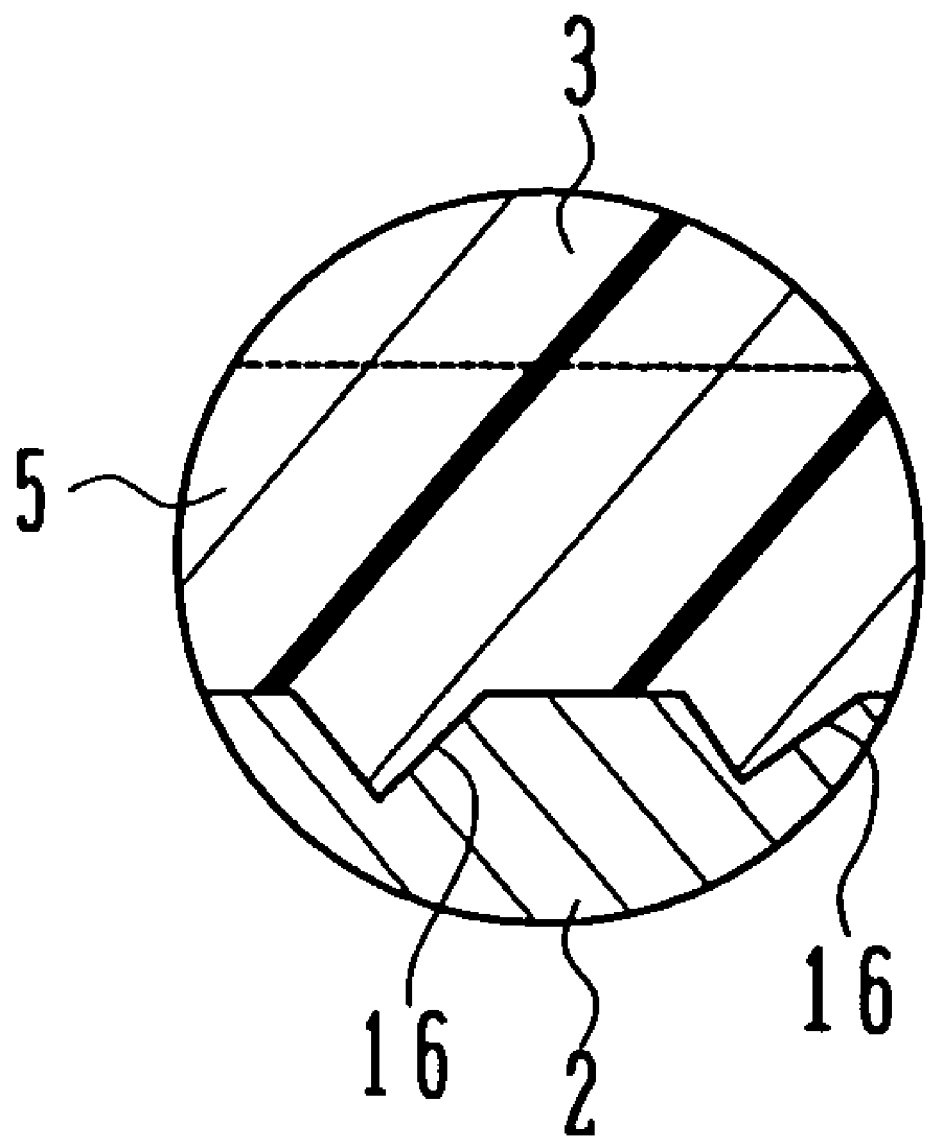
FIG. 2 is an enlarged diagram showing a part of the electric rotary machine of FIG. 1.

The heat conductive insulation resin 5 is filled between the frame 2 and the stator 30. Grooves 16 serving as a resin capture means are formed at a junction surface between the resin and the frame 2 as shown in FIG. 2.

Hereinafter, the electric rotary machine according to the embodiment will be explained further in detail based on the drawings.

FIG. 1 is a sectional diagram showing an embodiment of an AC generator for a vehicle according to the present invention. In the frame 2 equipped with a cooling water channel 1, the stator core 4 around which the stator coil 3 is wound is fitted into and fixed to the inner diameter side of the frame 2. The heat conductive insulation resin 5 (that is, unsaturated polyester) is filled through the injection molding etc. at the periphery of the stator coil 3, between the inner peripheries of the coil end portion and the frame 2 and at the slot portion of the stator core 4. A rotor 6 is supported at the inner diameter side of the stator core 4 by the front bracket 9 and the bottom portion 10 of the bowl-shaped wall surface of the frame 2 through the bearings 7 and 8. A pulley 11 is coupled to a driving source such as an engine through a belt and rotates and drives the rotor 6. Within the rear bracket 12, a brush 13, a diode 14 for rectifying an output current from the stator coil 3 and a regulator for controlling an output of the generator etc. are disposed. The center plate 15 seals the cooling water channel 1 of the frame 2. The diode 14 is pressed into the center plate and cooled by the cooling water. In this embodiment, the frame 2 is made from maglite, the stator coil 3 is formed by a heat-resistant insulating coating wire (polyamide imide wire etc.) and the stator core 4 is formed by a laminated iron core. In this case, the linear thermal expansion coefficient $\alpha 1$ of the laminated iron core is $1.18 \times 10^{-5}/°$ C., the linear thermal expansion coefficient $\alpha 2$ of the stator coil 3 is $1.65 \times 10^{-5}/°$ C., the linear thermal expansion coefficient $\alpha 4$ of the maglite is $2.31 \times 10^{-5}/°$ C., and the linear thermal expansion coefficient $\alpha 3$ of the unsaturated polyester is in a range of 2.0 to $3.5 \times 10^{-5}/°$ C. In the operating state of the generator according to the embodiment, the temperature of the inner peripheral surface of the frame 2 is 120° C. in average and the temperature of the stator coil 3 is 200° C. in average. According to the present invention, in the case where the inner diameter of the frame 2 is 128 mm and the linear thermal expansion coefficient of unsaturated polyester is $2.8 \times 10^{-5}/°$ C., for example, when the generator shifts from a stop state to the operating state, a fastening margin for the frame 2 and the filling resin due to thermal thermal expansion is 0.17 mm, and a stress generated at the frame 2 is 9.2 kg/mm² which is about a half of the yield strength or proof strength of maglite. On the other hand, when the conventional silicon resin (with a linear thermal expansion coefficient of $1.5 \times 10^{-4}/°$ C.) is filled, a fastening margin for the frame 2 and the filling resin due to thermal thermal expansion is 1.73 mm which is about ten times as large as that of the embodiment. In the case of filling unsaturated polyester of a low linear thermal expansion type (with a linear thermal expansion coefficient of $1.2 \times 10^{-5}/°$ C., for example) having been used for coil sealing, a fastening margin for the frame 2 and the filling resin due to thermal thermal expansion is −0.01 mm, so that a clearance appears between the frame 2 and the filling resin and so heat conduction from the filling resin to the frame 2 is obstructed. Thus, according to the embodiment, an excessive stress is not caused but a suitable tension force is caused at the inner periphery of the frame 2, and so heat can be transferred surely and the dissipation efficiency can be improved.

Further, according to the embodiment, when the filling resin is injected from the bowl type wall surface side, the filled resin end becomes an opened non-bowl type side, so that the shortage of the filling such as a short-mould can be visually confirmed easily and so quality can be improved.

Further, according to the embodiment, the filling resin is filled into the grooves 16 at the inner periphery of the frame 2, whereby the molded component can be surely removed and so the productivity can be improved. Further, due to the provision of the plural grooves 16, the heat conduction area from the filling resin to the frame 2 increases and so the dissipation efficiency can be improved.

Figure 3:
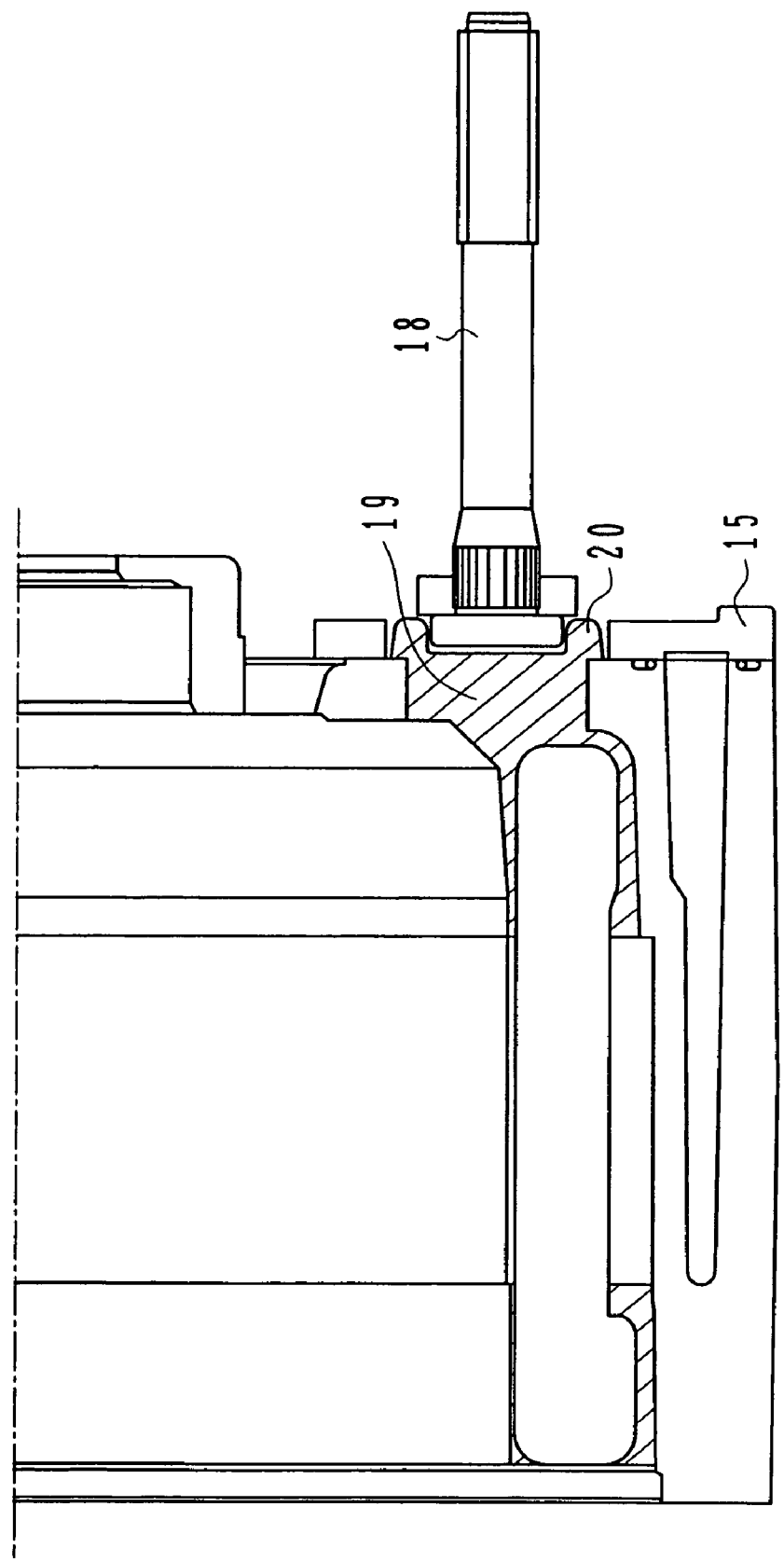
FIG. 3 is a sectional diagram showing the structure of an output terminal of FIG. 1.

FIG. 3 is a sectional diagram showing the insulation structure of an output terminal end portion in this embodiment. In order to secure the insulation between an output terminal 18 and the frame 2 and the center plate 15, a filling resin flowing hole 19 is provided at the bowl-shaped bottom portion of the frame 2 and a projection 20 covering the output terminal end portion is integrally formed by the filling resin. Thus, the output terminal can be surely insulated without increasing insulation parts.

The modes for carrying out the invention in the electric machine according to the embodiment are as follows.

1. In a electric rotary machine including an annular stator core; a stator coil wound around the stator core; a frame fit in and fixed to an outer peripheral portion of the stator core; and heat conductive insulation resin filled into slot portions of the stator core in which the coil is inserted and also filled at end portions of the stator coil between both end surfaces of the stator core and inner periphery of the frame, wherein a linear thermal expansion coefficient $\alpha1$ of the stator core, a linear thermal expansion coefficient $\alpha2$ of the stator coil, a linear thermal expansion coefficient $\alpha3$ of the heat conductive insulation resin being filled and a linear thermal expansion coefficient $\alpha4$ of the frame are set to have a relation that $\alpha1<\alpha2<\alpha4\leq\alpha3$.

2. The stator core is a laminated core formed by a rolled plate or a silicon steel plate, the stator coil is an enamel wire formed by coating heat-resistant insulation resin film over a copper wire, the heat conductive insulation resin being filled is formed by unsaturated polyester, and the frame is formed by maglite.

3. The frame is configured in a bowl shape at its one side. The stator core around which the core is wound is inserted and fit into in an axial direction from the opened portion of the frame opposing to the bowl-shaped portion and fixed, then the heat conductive insulation resin is injected into the frame through a resin injection port provided at the bowl-shaped bottom portion of the frame thereby to integrally mold the stator core, the coil and the frame.

4. Plural grooves are formed at the inner periphery of the frame opposing to the end portion of the stator coil.

5. An insulation member of an output terminal is integrally formed with insulation resin filled between the stator and the frame of the electric rotary machine.

The effects of the embodiment will be explained.

The linear thermal expansion coefficient $\alpha3$ of the heat conductive resin filled between the coil of the stator and the frame of the electric rotary machine is almost same as or slightly larger than the linear thermal expansion coefficient $\alpha4$ of the frame. Thus, in the operation state of the electric rotary machine, a tension force is generated between the frame and the filling resin, whereby the surely adhering state can be held therebetween and so heat can be transferred efficiently from the filling resin to the frame.

Further, since the unsaturated polyester resin serving as the heat conductive insulation resin is low in an adhesive force, the influence of the relative deviation due to the thermal thermal expansion between the coil and the resin can be relaxed and further the occurrence of insulation failure such as rare short due to the damage of the insulation cover of the coil surface can be avoided, whereby the reliability can be improved.

Furthermore, as the method of filling the heat conductive insulation resin between the stator coil and the inner periphery of the frame of the bowl-shaped frame, a resin injection port is provided at the bowl-shaped wall surface and the heat conductive insulation resin is injected and filled through the port in the direction opposing to the bowl-shaped direction of the frame by using the mold. Thus, after hardening the resin and removing the mold, the filling state of the resin on the filled end side can be confirmed visually and so the reliability of the molded product can be ensured.

Furthermore, the plural grooves are formed in advance at the inner periphery of the frame opposing to the end portion of the stator coil of the electric rotary machine according to the embodiment, and the stator core, the stator coil and the frame are integrally formed by using the heat conductive insulation resin, so that the contact area between the heat conductive insulation resin and the inner periphery of the frame can be enlarged and so the dissipation efficiency can be improved.

Furthermore, since the heat conductive insulation resin is filled within the grooves of the inner periphery of the frame, the stator core, the coil and the filled resin are surely integrated due to the anchor effect, so that the molded component can be easily removed from the mold and so the productivity can be improved.

Furthermore, since the insulation member of the output terminal portion can be integrally formed by the filling resin, the number of the parts can be reduced and the assembling procedure of the insulation member can be eliminated and so the productivity can be improved.

According to the present invention, the filling resin can be surely adhered to the inner periphery of the frame, so that the dissipation efficiency of the stator coil can be improved and sot the electric rotary machine with a higher output can be provided.

Further, according to another invention, the cooling medium path can be formed easily.

Furthermore, according to still another invention, the productivity of the electric rotary machine provided with the cooling medium path can be improved.

What is claimed is:

1. An electric rotary machine comprising:
a frame formed by an inner side frame and an outer side frame, and
the inner side frame is bowl shaped such that one end of said inner side frame defines an opening and an axially opposite end defines a bottom portion, and
a stator located within said opening of said inner side frame; wherein
the outer side frame forms an outer surface of the electric rotary machine, and
the inner side frame and the outer side frame constitute an integrally molded component and are shaped with a cavity therebetween, which cavity is open at a face forming the bottom portion and terminates at a location axially spaced from the face.

2. An electric rotary machine according to claim 1, wherein the electric rotary machine frame is made from aluminum and formed with a cylindrical cavity portion which is configured in a manner such that the bottom portion side is opened between the inner periphery and the outer periphery of the frame and said open side of said inner frame is sealed and cooling medium is injected into the cavity portion of the frame the electric rotary machine further comprising;
a sealing member attached to the open side of the cavity portion to hermetically seal the open end,
a bracket attached to the opened end side of the bowl shaped frame and provided with a bearing at a center thereof,
another bearing fixed at a center portion of the bottom portion of the bowl-shaped frame, and
a rotor pivotally supported between the bearings.

3. An electric rotary machine according to claim 2, wherein a screw fixes the bracket to an end surface of the frame.

4. An electric rotary machine according to claim 2, further comprising:
another bracket covering outside of the sealing member and attached to an end portion of the sealing member at a side opposite to the bracket side thereof, and
a brush disposed between another bracket and the sealing member.

5. An electric rotary machine comprising:
a frame comprising an inner side frame and an outer side frame, wherein the outer side frame forms an outer surface of the electric rotary machine, and the inner side frame is bowl-shaped, wherein one side of the inner side frame defines an opening and an axially opposite end defines a bottom portion;

a stator located radially inward of the inner side frame and attached to an inner wall of the inner side frame; wherein, the inner side frame and the outer side frame constitute an integrally molded component and are shaped with a cavity therebetween, wherein the cavity is open at a first end of the cavity defined by the bottom portion of the inner side frame and is closed at a second end of the cavity at a location axially spaced from the first end.

* * * * *

UNITED STATES PATENT AND TRADEMARK OFFICE
CERTIFICATE OF CORRECTION

PATENT NO.         : 7,429,810 B2
APPLICATION NO. : 11/226299
DATED                : September 30, 2008
INVENTOR(S)       : Toshiaki Ueda et al.

It is certified that error appears in the above-identified patent and that said Letters Patent is hereby corrected as shown below:

Title Page: should read;

(75) Inventors: Toshiaki UEDA, Chiyoda-ku (JP); Takeshi SAKAI, Chiyoda-ku (JP); Susumu TERUMOTO, Chiyoda-ku (JP); --Toshinori WATANABE, Chiyoda-ku (JP)--

Signed and Sealed this

Twenty-fourth Day of November, 2009

David J. Kappos
*Director of the United States Patent and Trademark Office*